(12) United States Patent
Dahle et al.

(10) Patent No.: US 10,952,564 B2
(45) Date of Patent: *Mar. 23, 2021

(54) GRIDDLE DEVICE, SYSTEM, AND METHOD

(71) Applicant: North Atlantic Imports, LLC, Logan, UT (US)

(72) Inventors: Roger Dahle, Providence, UT (US); Ryan D. Sharp, American Fork, UT (US)

(73) Assignee: North Atlantic Imports, LLC, Logan, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/448,639

(22) Filed: Jun. 21, 2019

(65) Prior Publication Data

US 2019/0365149 A1 Dec. 5, 2019

Related U.S. Application Data

(63) Continuation of application No. 15/582,675, filed on Apr. 29, 2017, now Pat. No. 10,327,588.

(Continued)

(51) Int. Cl.
*A47J 37/06* (2006.01)
*A47J 37/07* (2006.01)
*F24C 15/14* (2006.01)

(52) U.S. Cl.
CPC ......... *A47J 37/067* (2013.01); *A47J 37/0682* (2013.01); *A47J 37/0713* (2013.01); *A47J 37/0786* (2013.01); *F24C 15/14* (2013.01)

(58) Field of Classification Search
CPC .. A47J 37/067; A47J 37/0682; A47J 37/0713; F24C 15/14

(Continued)

(56) References Cited

U.S. PATENT DOCUMENTS 2,362,757 A ‡ 11/1944 Lang .................. F24C 15/14
126/211
2,786,929 A ‡ 3/1957 Michaelis ............ F24C 15/105
219/44

(Continued)

FOREIGN PATENT DOCUMENTS

BR 202016004899 U2 9/2017
CN 204379007 U 6/2015

(Continued)

OTHER PUBLICATIONS

Declaration of Inna Doliner, *North Atlantic Imports, LLC v. Nexgrill Industries, Inc.*, Case No. 5:19-CV-1195-AB-AFM, Jun. 29, 2020, 6 pages

(Continued)

*Primary Examiner* — Kevin F Murphy
(74) *Attorney, Agent, or Firm* — David L. Stott (57) ABSTRACT

Embodiments of a griddle system, device, and method configured to manage unwanted food byproducts. The griddle system includes a griddle having an upper side and an underside. The upper side includes a flat cooking surface and a splash guard, the flat cooking surface having a rectangular shape extending to a rear end, a front end, a left end and a right end. The splash guard extends along a periphery of the upper side of the griddle, the upper side including a trough. The trough extends laterally from the rear end of the cooking surface and extends longitudinally along a length of the rear end of the cooking surface such that the trough defines an elongated through hole therein.

20 Claims, 6 Drawing Sheets

Related U.S. Application Data (60) Provisional application No. 62/331,666, filed on May 4, 2016.

(58) Field of Classification Search
USPC .................................................. 99/444, 446
See application file for complete search history.

(56) References Cited

U.S. PATENT DOCUMENTS

| | | | |
|---|---|---|---|
| 2,817,331 | A | 12/1957 | Kaplan et al. |
| 3,046,971 | A | 7/1959 | Hogshire |
| 3,130,664 | A | 4/1964 | Jarmuth et al. |
| 3,317,709 | A | 5/1967 | Beasley |
| 3,714,885 | A | 2/1973 | Wertheimer et al. |
| 4,119,021 | A ‡ | 10/1978 | Moses .................... A47J 37/067 126/215 |
| 4,320,699 | A | 3/1982 | Binks |
| 4,321,857 | A | 3/1982 | Best |
| 4,598,634 | A ‡ | 7/1986 | Van Horn, II ........ A47J 37/067 99/340 |
| 4,608,917 | A ‡ | 9/1986 | Faaborg ................ A47J 37/067 99/340 |
| 4,899,725 | A | 2/1990 | Barron, Jr. |
| 4,909,137 | A ‡ | 3/1990 | Brugnoli ............ A47J 37/0682 126/41 |
| 5,325,843 | A * | 7/1994 | Bravata, Jr. ......... A47J 37/0786 126/25 R |
| 5,413,032 | A | 5/1995 | Bruno et al. |
| 5,606,905 | A | 3/1997 | Boehm et al. |
| 5,678,531 | A ‡ | 10/1997 | Byers .................... A47J 37/0704 126/25 |
| 5,850,780 | A | 12/1998 | Mascia et al. |
| 5,884,555 | A ‡ | 3/1999 | Chang .................. A47J 37/067 99/400 |
| 5,911,812 | A ‡ | 6/1999 | Stanek .................. A47J 37/067 126/25 |
| 5,964,145 | A ‡ | 10/1999 | Brown ................ A47J 37/1261 126/39 |
| 6,205,995 | B1 ‡ | 3/2001 | Odenwald ................ F24C 3/14 126/25 R |
| 6,257,126 | B1 | 7/2001 | Velikovic et al. |
| 6,463,924 | B1 | 10/2002 | Osterman |
| 6,644,175 | B2 ‡ | 11/2003 | Stephen ............... A47J 37/0786 126/41 |
| 6,776,085 | B1 | 8/2004 | Tang |
| 6,802,308 | B1 | 10/2004 | Nugent et al. |
| 6,930,288 | B1 | 8/2005 | Lin et al. |
| 7,340,994 | B2 * | 3/2008 | Bruno .................... A47J 37/067 99/426 |
| 7,514,655 | B2 | 4/2009 | Fernandez et al. |
| 7,635,827 | B2 | 12/2009 | Sie et al. |
| 7,638,738 | B1 ‡ | 12/2009 | Babington ........... A47J 37/0713 126/15 |
| 7,872,213 | B2 | 1/2011 | De Leon et al. |
| 8,137,723 | B1 ‡ | 3/2012 | Blount .................... A47J 37/01 426/52 |
| 8,151,698 | B2 ‡ | 4/2012 | Mehta ..................... F24C 15/14 99/425 |
| D694,056 | S ‡ | 11/2013 | Dahle .......................... D7/334 |
| 9,192,178 | B2 ‡ | 11/2015 | Berge ......................... A23L 5/10 |
| D745,802 | S ‡ | 12/2015 | Yao .............................. D7/352 |
| 9,215,949 | B1 ‡ | 12/2015 | Cloutier .............. A47J 37/0694 |
| 9,801,497 | B2 | 10/2017 | Feng |
| 10,327,588 | B2 | 6/2019 | Dahle et al. |
| 10,327,589 | B1 * | 6/2019 | Dahle .................... B65C 3/065 |
| 10,588,461 | B2 | 3/2020 | Dahle |
| 2004/0216730 | A1 | 11/2004 | Sawhney et al. |
| 2006/0016348 | A1 | 1/2006 | Babington |
| 2007/0006740 | A1 | 1/2007 | Lam |
| 2012/0237647 | A1 | 9/2012 | Dobert et al. |
| 2014/0352551 | A1 | 12/2014 | Ducate et al. |
| 2015/0335200 | A1 ‡ | 11/2015 | Ortner .................. A47J 37/067 99/425 |
| 2016/0206148 | A1 | 7/2016 | Sawhney et al. |
| 2017/0332839 | A1 | 11/2017 | Dahle et al. |

FOREIGN PATENT DOCUMENTS

| | | |
|---|---|---|
| DE | 7014047 U | 12/1970 |
| DE | 19935983 A1 | 2/2001 |
| EP | 1071355 B1 | 4/2004 |
| GB | 2485370 A | 5/2012 |
| KR | 20110003717 U | 4/2011 |
| KR | 20120003525 U | 5/2012 |
| KR | 20140083215 A | 7/2014 |
| WO | WO2011149216 A2 | 12/2011 |

OTHER PUBLICATIONS

Cuisinart Instruction Booklet, Cuisinart Griddler Panini & Sandwich Press GR-1, 5 pages.
Cuisinart Instruction Booklet, Cuisinart Griddler GR-4, 9 pages.
Cuisinart Instruction Booklet, Cuisinart Griddler Compact GR-35, 23 pages.
Cuisinart Instruction and Recipe Booklet, Cuisinart Griddler GR-4N, 28 pages.
Cuisinart Instruction and Recipe Booklet, Cuisinart Griddler Grill & Panini Press GR-11, 20 pages.
Cuisinart Instruction Booklet, Griddler Deluxe GR-150 Series, 37 pages.
Cuisinart Griddler Series Photographs, 29 pages.
Declaration of Paul Forrest, *North Atlantic Imports, LLC v. Nexgrill Industries, Inc.*, Case No. 5:19-CV-1195-AB-AFM, Jun. 23, 2020, 4 pages.
Vulcan's Product Catalog, 85 pages.
Vulcan's Product Catalog, 87 pages.
Vulcan's MSA Series Griddles Specification Sheet, which includes the MSA48 Model, 2 pages.
Vulcan's 900RX Series Griddles Specification Sheet, which includes the 948RX Model, 2 pages.
Vulcan's 948RX/MSA48 Griddle, Jun. 16, 2014, 1 page.
Complaint for Patent Infringement, *North Atlantic Imports, LLC v. Nexgrill Industries, Inc.*, Case No. 5:19-cv-1195, Jun. 27, 2019, 102 pages.
Defendent Nexgrill Industries, Inc.'s Answer to Plaintiff's Complaint for Patent Infringement, *North Atlantic Imports, LLC v. Nexgrill Industries, Inc.*, Case No. 5:19-CV-1195-AB-AFM, Jan. 24, 2020, 8 pages.
Defendant's Initial Disclosures, *North Atlantic Imports, LLC v. Nexgrill Industries, Inc.*, Case No. 5:19-CV-1195-AB-AFM, Feb. 28, 2020, 7 pages.
Defendant Nexgrill Industries, Inc.'s Response to Plaintiff's First Set of Interrogatories, *North Atlantic Imports, LLC v. Nexgrill Industries, Inc.*, Case No. 5:19-CV-1195-AB-AFM, May 20, 2020, 20 pages.
MagiKitch'n Model MKG Gas Griddle 24", 36", 48", 60" and 72" Specification Sheet, Oct. 2017, 2 pages.
Royal Gourmet Owner's Manual, Model GB2000, 22 pages.
Royal Gourmet Owner's Manual, Model GB5000S—Burner Gas Griddle Stainless Steel (/n/557), 2009-2017, 5 pages.
Royal Gourmet Owner's Manual, Model GD401—Premium 4-Burner Outdoor Gas Grill and Griddle, 20 pages.
MagiKitch'n Model MKG Gas Griddle 24", 36", 48", 60" and 72" Specification Sheet, Oct. 2013, 2 pages.
MagiKitch'n Model MKG Gas Griddle 24", 36", 48", 60" and 72" Specification Sheet, Sep. 2011, 2 pages.
MagiKitch'n Model MK Griddle Exterior Construction Specification Sheet, 2 pages.
MagiKitch'n Model MKG-36 Gas Griddle Performance Test Report, Dec. 2009, 44 pages.
Southbend Counterline—Griddle, Heavy Duty, Thermostatic, Gas Models HDG-24, HDG-36, HDG-48, HDG-60, HDG-72, HDG-36-RE, HDG-48-RE, HDG-60-RE, Specification Sheet, Mar. 2011, 2 pages.

(56) References Cited

OTHER PUBLICATIONS

Why Vulcan Griddles?, https://www.vulcanequipment.com/griddles, search date Feb. 12, 2020, 2 pages.

\* cited by examiner
‡ imported from a related application

GRIDDLE DEVICE, SYSTEM, AND METHOD

CROSS-REFERENCE TO RELATED APPLICATIONS

This application is a continuation of U.S. patent application Ser. No. 15/582,675, filed Apr. 29, 2017, which claims the benefit of U.S. Provisional Application No. 62/331,666, filed May 4, 2016, the disclosures of which are hereby incorporated by reference in their entirety.

TECHNICAL FIELD

The present invention relates generally to gas heated cooking stations with a griddle and, more specifically, the present invention relates to managing grease and food byproduct with the griddle of the cooking station.

BACKGROUND

Barbequing has become a popular and pervasive tradition in much of the world. A barbeque grill is a device for cooking food by applying heat directly below a grill. There are several varieties of grills but most fall into one of two categories, either gas fueled or charcoal. Gas fueled grills typically use propane or natural gas as a fuel source, with the gas flame either cooking the food directly or heating grilling elements which in turn radiate the heat necessary to cook the food. Grilling has become a popular method of cooking food due to the unique flavors and texture imparted to the food during the grilling process.

A griddle is a cooking device consisting of a broad flat surface that can be heated using a variety of means and is used in both residential and commercial applications for a variety of cooking operations. The griddle is most commonly a flat metal plate composed of cast or wrought iron, aluminum or carbon steel. Griddles are commonly heated directly or indirectly by open flame or electrical elements. Using a griddle placed directly on a barbeque grill or over flame burners has also become popular when cooking foods not as well suited for cooking directly on a grill over an open flame.

One concern with griddle cooking is the grease and byproduct build-up that inevitably occurs. Some griddles include a drain system to manage the grease either on the side or front of the griddle. Such locations keep the grease and byproduct in areas relative to the griddle and cook station that are viewable and in the region where the user is cooking, which is unsightly and still provides the potential for grease to spill and build-up over the front side of the cooking station. Further, this grease build-up will often spread to the user's clothing.

BRIEF SUMMARY OF THE INVENTION

The present invention is directed to devices, systems, and methods of a griddle system configured to manage unwanted food byproducts. The griddle system includes a griddle having an upper side and an underside. The upper side includes a flat cooking surface, a splash guard, and a trough. The cooking surface includes a rectangular shape extending to a rear end, a front end, a left end and a right end. The splash guard extends along a periphery of the upper side of the griddle. The trough extends laterally from the rear end of the cooking surface and extends longitudinally along a length of the rear end of the cooking surface such that the trough defines an elongated through hole therein.

In one embodiment, the splash guard defines an elongated slot extending through the splash guard such that the elongated slot is positioned directly above the elongated through hole. In a further embodiment, the elongated slot is sized to receive a cooking utensil therethrough for scraping the cooking utensil against a portion of the splash guard defining the elongated slot.

In another embodiment, the griddle system further includes a grease container. The grease container includes a container portion and a latching portion, the latching portion configured to latch onto the splash guard so that the container portion is positioned below the elongated through hole. In a further embodiment, the latching portion includes a latch and an extension, the latch configured to couple to the splash guard and the extension extending from the latch to the container portion, the extension defining a window therein such that the extension is configured to be positioned along a back side of the back splash with the window positioned around the elongated through hole.

In another embodiment, the griddle system further includes a grease container configured to be removably coupled to the griddle such that a container portion of the grease container is positioned below the elongated through hole. In still another embodiment, the griddle system further includes at least two height adjusting members coupled to an underside of the griddle, the at least two height adjusting members configured to modify a slope of the flat cooking surface.

In accordance with another embodiment of the present invention, a cooking station configured to manage unwanted food byproduct is provided. The cooking station includes a frame and a griddle. The frame includes a front side, a rear side, a left side and a right side each extending between a lower portion and an upper portion. Such frame includes multiple heating elements coupled to the frame. The griddle is configured to be supported by the upper portion of the frame. The griddle includes an upper side and an underside, the upper side including a flat cooking surface, a splash guard, and a trough. The flat cooking surface includes a rectangular shape extending to a rear end, a front end, a left end and a right end. The splash guard extends along a periphery of the upper side of the griddle. The trough extends laterally from the rear end of the cooking surface and extends longitudinally along a length of the rear end of the cooking surface such that the trough defines an elongated through hole therein.

In one embodiment, the splash guard defines an elongated slot extending through the splash guard, the elongated slot positioned directly above the elongated through hole. In a further embodiment, the elongated slot is sized to receive a cooking utensil therethrough for scraping the cooking utensil against a portion of the splash guard defining the elongated slot.

In another embodiment, the cooking station further includes a grease container, the grease container including a container portion and a latching portion, the latching portion configured to latch onto the splash guard so that the container portion is positioned below the elongated through hole. In a further embodiment, the latching portion includes a latch and an extension, the latch configured to couple to the splash guard and he extension extending from the latch to the container portion, the extension defining a window therein such that the extension is configured to be positioned along a back side of the back splash with the window positioned around the elongated through hole.

In another embodiment, the cooking station further includes a grease container configured to be removably coupled to the griddle such that a container portion of the grease container is positioned below the elongated through hole. In another embodiment, the cooking station further includes at least two height adjusting legs coupled to an underside of the griddle, the at least two height adjusting legs configured to modify a slope of the flat cooking surface.

In accordance with another embodiment of the present invention, a method for managing grease at a cooking station is provided. The method includes: supporting a griddle on an upper portion of a frame of a cooking station with heating elements coupled thereto, the griddle having a flat cooking surface with a splash guard extending along a periphery of the griddle; and draining grease from cooked food on the cooking surface to a trough extending longitudinally only along a rear end of the cooking surface such that the grease moves along the trough and then through a through hole defined in trough.

In one embodiment, the method further includes depositing the grease in a grease container coupled to the griddle and positioned below the through hole defined in the trough. In another embodiment, the step of depositing the grease in the grease container includes positioning the grease container with a latch portion and a container portion such that the latch portion hangs on the splash guard above the through hole and such that the latch portion extends with a window defined therein that surrounds the through hole with the container portion suspended below the through hole. In a further embodiment, the method includes scraping a cooking utensil on the splash guard by inserting the cooking utensil through an elongated slot defined in the splash guard such that the elongated slot is positioned above the through hole defined in the trough and such that the elongated slot is surrounded by the window defined in the latch portion of the grease container. In another embodiment, the step of depositing the grease includes depositing the grease in the grease container that is removably coupled to the splash guard. In another embodiment, the step of draining grease includes providing the griddle with at least two height adjusting legs extending from an underside of the griddle, the height adjusting legs for modifying a slope of the flat cooking surface of the griddle.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
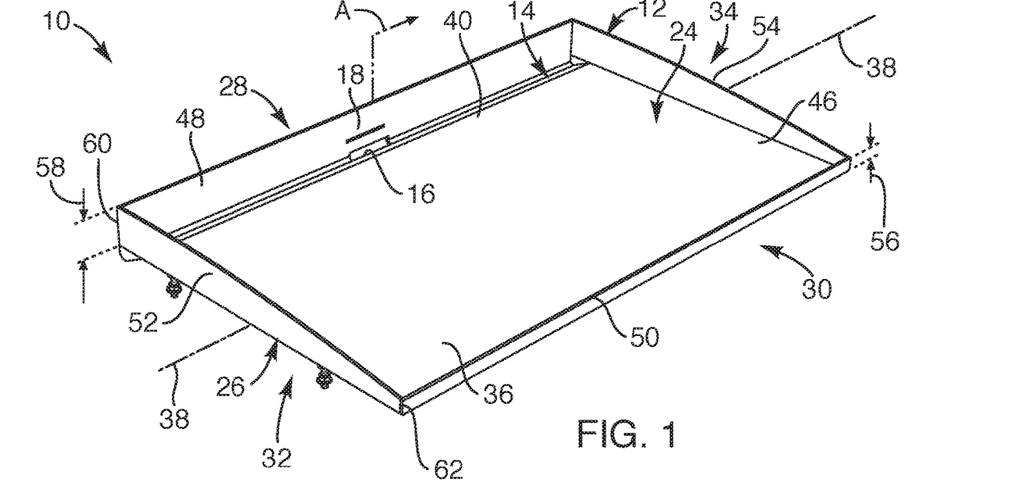
FIG. 1 is a perspective front view of a griddle, according to one embodiment of the present invention.
Figure 2:
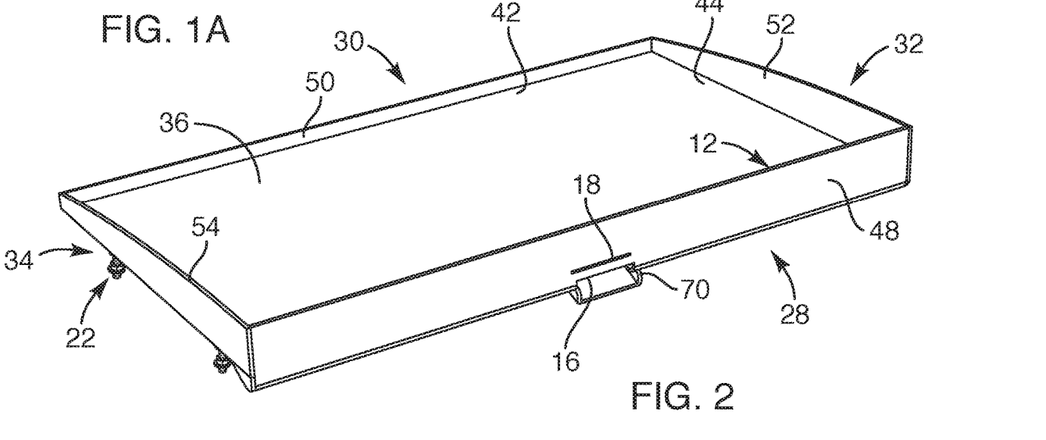
FIG. 2 is a perspective rear view of the griddle, according to another embodiment of the present invention.

Referring to FIGS. 1 and 2, respective front and rear perspective views of a griddle 10 are provided. The griddle 10 may be sized and configured to be supported by an upper portion of a cooking station 100 (FIG. 7), such as an outdoor cooking station with gas flame burners. Such griddle 10 may be employed with various components to manage grease and to keep the user substantially clean of such grease. In various embodiments of the present invention, components employed to manage grease while cooking on the griddle 10 may include a splash guard 12, a rear extending trough 14 with a through hole 16, an elongated slot 18, a grease container 20 (FIG. 3), and height adjusting legs 22, each of which will be described in further detail herein.

The griddle 10 may include an upper side 24 and an underside 26 or bottom with a periphery defining a rear side 28, a front side 30, a left side 32 and a right side 34. The upper side 24 of the griddle 10 may include a flat cooking surface 36 that may be elongated and rectangular shaped to define a longitudinal axis 38. The flat cooking surface 36 may extend between a rear end 40 and a front end 42 and between a left end 44 and a right end 46 to define the flat cooking surface 36. The upper side 24 of the griddle 10 may also include the splash guard 12 and the trough 14.

The splash guard 12 of the griddle 10 may extend upward from the upper side 24 of the griddle 10 and along at least a portion of the periphery of the griddle 10. In one embodiment, the splash guard 12 may extend continuously along the periphery of the griddle 10. For example, the griddle 10 may include a rear splash guard 48, a front splash guard 50, a left splash guard 52, and a right splash guard 54 each extending along the corresponding rear side 28, front side 30, left side 32 and right side 34, respectively, of the periphery of the griddle 10. The splash guard 12 may be sized and configured to block hot spattering grease from out-side the periphery of the griddle 10 as well as act as a barrier to prevent grease from spilling over the griddle 10 and to the burners below the griddle 10.

The front splash guard 50 may be elongated to extend along an entire length of the front end 42 of the cooking surface 36. Further, the front splash guard 50 may extend upward a front guard height 56. The rear splash guard 48 may extend along an entire length of the trough 14 and further rearward and adjacent to the rear end 40 of the cooking surface 36 with a rear guard height 58. The rear guard height 58 may be higher than the front guard height 56. The left and right splash guards 52, 54 may include similar profiles extending between first and second ends 60, 62 thereof, the first end 60 of each of the left and right splash guards 52, 54 coupled to opposite ends of the rear splash guard 48 and the second end 62 of each of the left and right splash guards 52, 54 coupled to opposite ends of the front splash guard 50. The first end 60 of each of the left and right splash guard 52, 54 may be higher than the second end 62 of each of the left and right splash guard 52, 54 such that the left and right splash guard 52, 54 may taper or slope in height toward the second end 62. With this arrangement, the second end 62 of the left and right splash guard 52, 54 may be similar in height to the front splash guard 50 and the first end 60 may be similar in height to the rear splash guard 48 such that the upper periphery of the splash guards 12 provides a substantially continuous transition between the ends of each of the splash guards 12. As described, the front splash guard 50 may be smaller in height than the rear splash guard 58 so that the user can effectively cook along the front side 30 of the griddle 10 without being impeded by the front splash guard 50.

Figure 1A:
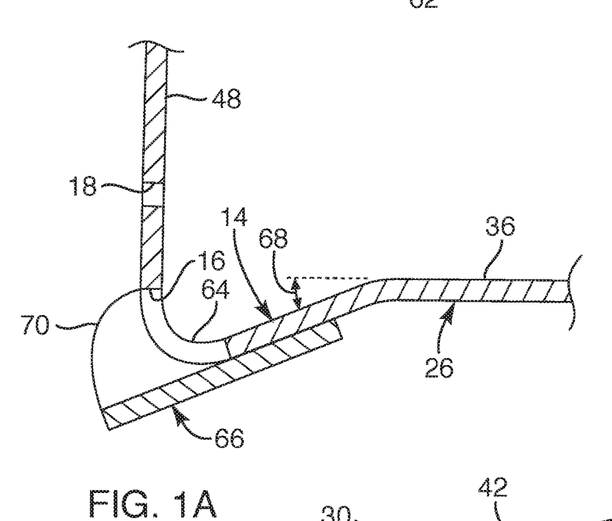
FIG. 1A is an enlarged cross-sectional view of the trough taken along section line A-A of FIG. 1, depicting a through hole and elongated slot and base plate under the through hole, according to another embodiment of the present invention.

With respect to FIGS. 1, 1A, and 2, as previously set forth, the griddle 10 may include a trough 14 sized and configured to receive grease or other food byproduct. The trough 14 may be elongated and extend longitudinally and parallel with the longitudinal axis 38 and may extend below and along the rear end 40 of the cooking surface 36 or, in other words, further rear than the cooking surface 36. The trough 14 may extend laterally from the cooking surface 36 at a downward angle 68 directly depending from the rear end 40 of the cooking surface 36 to a bottom trough surface 64 and then extend upward so as to transition into the rear splash guard 48. In one embodiment, the griddle 10 includes a single trough extending only along the rear end 40 of the cooking surface 36 such that there are no other troughs extending along the length of the front end 42, left end 44 and right end 46 of the cooking surface 36. In another embodiment, the trough 14 extends an entire length corresponding with the rear end 40 of the cooking surface 36. With this arrangement, the trough 14 extending along the rear end 40 of the cooking surface 36 allows for the user to push away the grease or unwanted food byproduct toward and off the rear end 40 of the cooking surface 36, and not forward or to the sides so that front and side portions of the cooking surface 36 and cooking station are more likely to be properly maintained and clean from unwanted grease.

Further, in another embodiment, the trough 14 may include a through hole 16 defined therein that may be sized and configured for receiving and feeding the grease or food byproduct from the trough 14 and through the through hole 16. In one embodiment, the through hole 16 may be elongated and may extend through a portion of the bottom trough surface 64. In another embodiment, the through hole 16 may be centered and aligned along the trough 14 and be positioned at a mid-point or mid-portion, relative to a length, of the trough 14. In another embodiment, the through hole 16 may be positioned along other locations along the trough 14, such as at one end of the trough 14.

In another embodiment, the through hole 16 may include a base plate 66 or under extension on which grease may funnel onto and over to deposit grease and food byproduct into a grease container 20 (FIG. 3), discussed in further detail herein. The base plate 66 may be coupled to and extend under the trough 14 and under the through hole 16. The base plate 66 may be positioned at an angle similar to the downward angle 68 of the trough 14 and may extend further rearward than the rear splash guard 48. The base plate 66 may also include upstanding side extensions 70 on both sides of the base plate 66 so as to appropriately act as a funnel for grease and food byproduct. With this arrangement, the base plate 66 positioned adjacent to the through hole 16 may further assist grease and food byproduct to be appropriately removed from the cooking surface 36 and griddle 10. Further, by positioning the trough 14 and through hole 16 at the rear of the griddle 10, the unsightly grease and food byproduct move out of view of the user.

Figure 3:
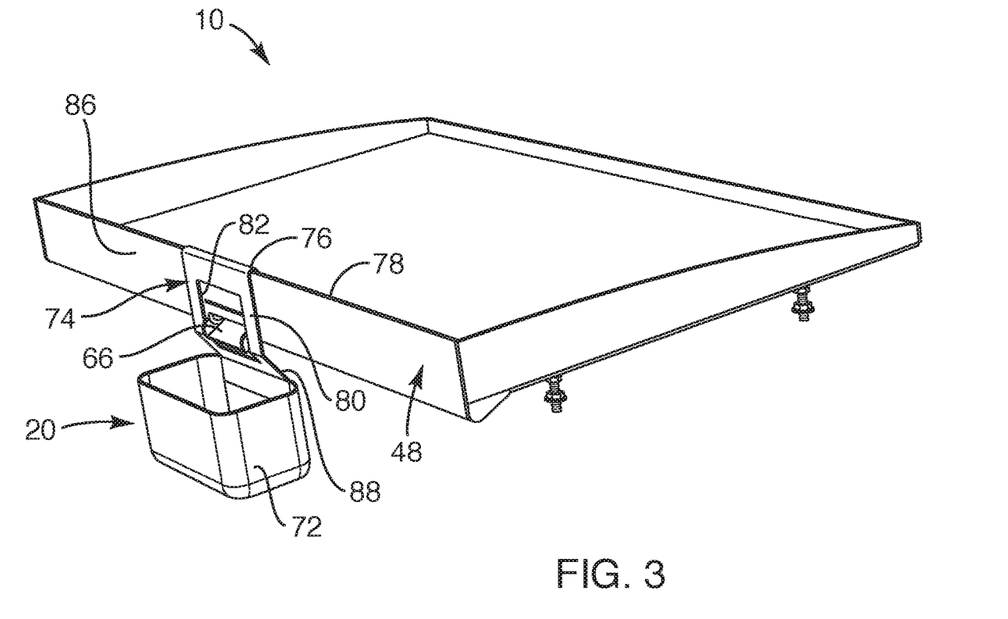
FIG. 3 is a perspective rear view of the griddle with a grease container coupled to the griddle, according to another embodiment of the present invention.

In another embodiment, the rear splash guard 48 may include an elongated slot 18 defined therein. The elongated slot 18 may be sized and configured to facilitate the user to insert a cooking utensil (not shown), such as a spatula, within the elongated slot 18 for scrapping the spatula along either a top edge and/or a bottom edge of the elongated slot 18. The elongated slot 18 may be positioned directly above the through hole 16. In one embodiment, the elongated slot 18 may include an elongated length similar to a length of the through hole 16. With this arrangement, the elongated slot 18 may be positioned directly above the through hole 16 so that grease and food byproduct deposited from both the elongated slot and the through hole will ultimately fall downward to the grease container 20 (FIG. 3).

Figure 4:
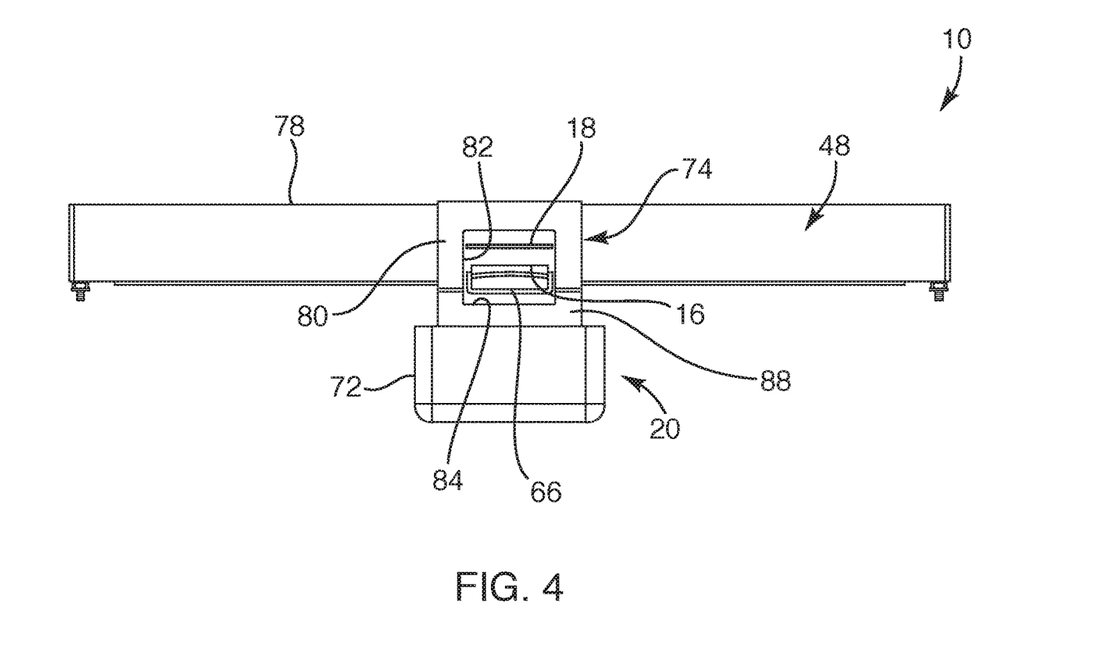
FIG. 4 is a rear view of the griddle with the grease container, according to another embodiment of the present invention.

Now with reference to FIGS. 3 and 4, the before-mentioned grease container 20 will be described in association with the griddle 10. The grease container 20 may be removably coupled to the griddle 10. The grease container 20 may include a container portion 72 and a latch portion 74. The latch portion 74 may include a free end 76 (see FIG. 7) sized and configured to couple directly to a top edge 78 of the rear splash guard 48. The latch portion 74 may include an extension 80 extending between the free end 76 and the container portion 72, the extension defining a window 82 or opening therein. In one embodiment, the window 82 may be sized and configured to be positioned to extend at least partially around the through hole 16. In another embodiment, the window 82 may be sized to be positioned to extend at least partially around the through hole 16 and the elongated slot 18. In another embodiment, a bottom edge surface 84 of the window may be positioned under the base plate 66 such that the base plate 66 may maintain the grease container 20 from becoming off-set laterally relative to the through hole 16. In this manner, the window 82 defined in the extension 80 may be positioned against a back side 86 of the rear splash guard 48 so that grease and food byproduct passing through the through hole 16 (and the elongated slot 18) also passes through the window 82, the window also acting to align and maintain the grease container 20 relative to the through holes 16, 18 with the base plate 66 positioned along a bottom portion of the window 82. In other words, the base plate 66 extending through the window 82 cooperates to block the grease container 20 from moving laterally along the rear splash guard 58 so as to maintain alignment of the grease container relative to the through hole 16.

In another embodiment, the extension 80, below the window 82, may extend inward at an angle (toward the griddle) with an angled extension 88 until terminating and coupling to the container portion 72. In this manner, the container portion 72 may be in-set or at an in-set position relative to the rear back splash 48 to ensure grease and food byproduct is appropriately deposited in the container portion 72 of the grease container 20. With this arrangement, the grease container 20 may cooperate with the profile of the rear back splash 48 as well as the through hole 16 and elongated slot 18 to appropriately dispose of grease and food byproduct. Such grease container 20 may readily be removed and cleaned-out and readily replaced while also being out of sight relative to a person's view while cooking.

Figure 5:
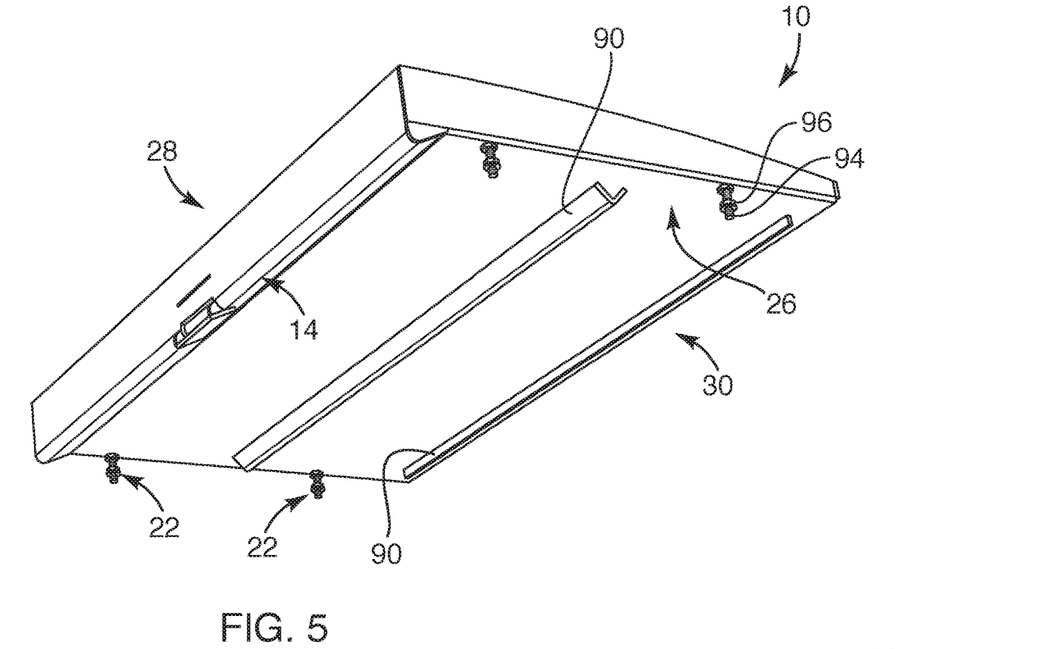
FIG. 5 is a perspective bottom-rear view of the griddle, according to another embodiment of the present invention.
Figure 6:
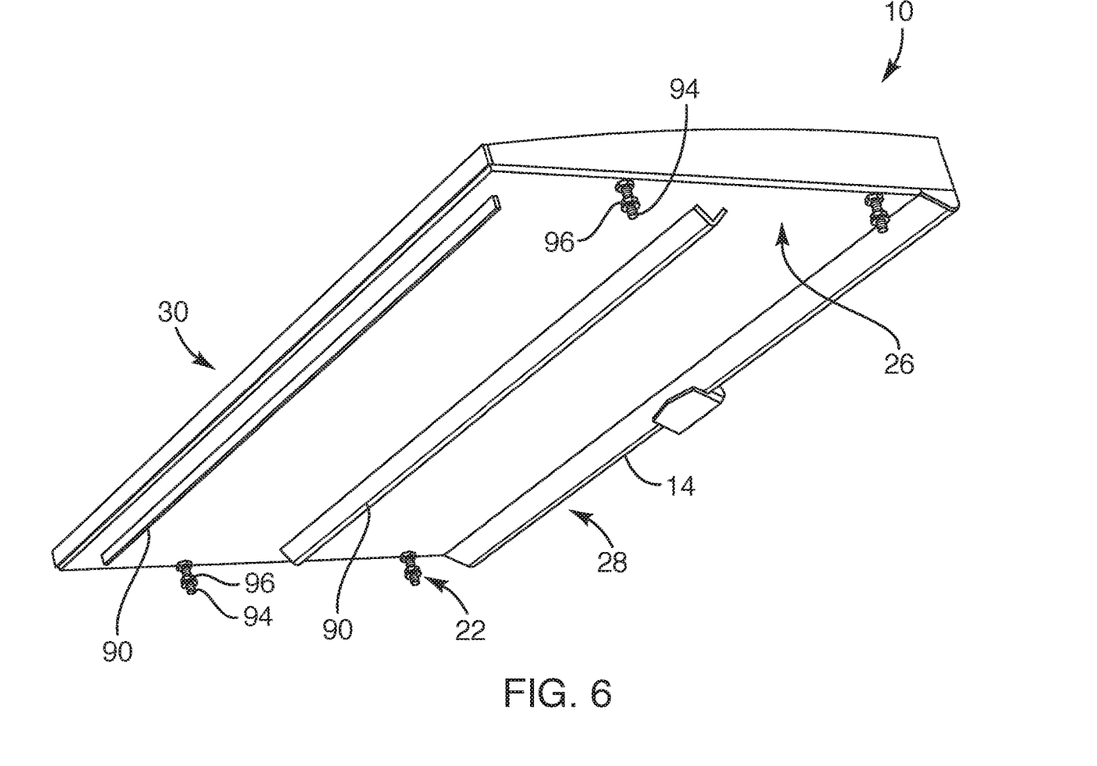
FIG. 6 is a perspective bottom-front view of the griddle, according to another embodiment of the present invention.

With reference to FIGS. 5 and 6, respective rear and front bottom perspective views of the underside 26 of the griddle 10 are depicted. The underside 26 of the griddle 10 may include one or more stabilizers 90. For example, the one or more stabilizers 90 may be positioned along a length of the griddle 10 to extend along a middle portion of the underside 26 of the griddle 10. Other one or more stabilizers 90 may also be positioned along the underside 26, such as along or adjacent the front side 30, of the griddle portion 10. The one or more stabilizers 90 may be positioned along the underside 26 to stabilize the griddle 10 and substantially prevent potential warping of the griddle 10 due to over-heating.

In one embodiment, the underside 26 of the griddle 10 may include at least two height adjusting members 22 or legs. For example, the griddle 10 may include four height adjusting members 22, two adjacent a front side 30 and two adjacent a rear side 28 of the underside 26 of the griddle 10, such as adjacent corners of the underside 26 of the griddle 10. In one embodiment, the height adjusting members 22 may extend directly from the underside 26 of the griddle 10. In another embodiment, the height adjusting members 22 may extend adjacent to the underside 26, such as along one or more sides of the griddle 10. In another embodiment, there may be two height adjusting members 22 for raising and lowering one side of the griddle 10.

Such height adjusting members 22 may be employed by a user to modify a slope of the cooking surface 36 (FIG. 1) of the griddle 10. For example, the height adjusting members 22 may be adjusted so that the two height adjusting members 22 that are closer to the front side 30 may be adjusted to extend longer than the two height adjusting members 22 that are closer to the rear side 28 of the griddle 10. Such adjustment may provide a slight slope of the cooking surface 36 toward the rear side 28 of the griddle 10 to more readily drain grease and food byproduct to the trough 14. In this manner, the slope of the cooking surface 36 of the griddle 10 may be modified to facilitate more effectively draining unwanted grease from the cooking surface 36 of the griddle 10. Similarly, depending on the food being cooked and if a user desires, the height adjusting members 22 may be modified so the cooking surface 36 is substantially level or slopes slightly toward the front side 30 of the griddle 10.

In one embodiment, the height adjusting members 22 may be adjusted with a tool (not shown) or the like. For example, the height adjusting members 22 may include a threaded member 94 and a threaded bolt 96 or the like, in which the bolt 96 may be turned with the tool to rotatably modify the height of the height adjusting members 22 or legs. With this arrangement, the height adjusting members 22 may be employed to manage grease run-off, in conjunction with other features of the griddle 10, to more effectively dispose of unwanted grease and food byproduct.

The griddle 10 may be manufactured from metallic materials, such as, carbon steel, cast iron, stainless steel, or aluminum, or various metal alloys, or composite layering of materials, or any other suitable cooking surface material known in the art, such as porcelain coated materials. In one embodiment, the metallic materials may be manufactured using cold rolled steel processes, or hot rolled steel techniques, or any other known manufacturing process, such as casting or stamping, as known in the art. The various plate components of the griddle 10 may include a thickness of 5-6 millimeters, but is not so limited, as such thickness of the various components of the griddle may range, for example, between 4-10 millimeters. Also, portions of the griddle 10, such as the trough and splash guards may be formed by employing cutting and bending techniques from sheet or plate material to form the griddle 10 as well as forming portions to the griddle 10 with welding techniques, or employing any other known process or techniques to form the griddle 10, as known by one of ordinary skill in the art.

Figure 7:
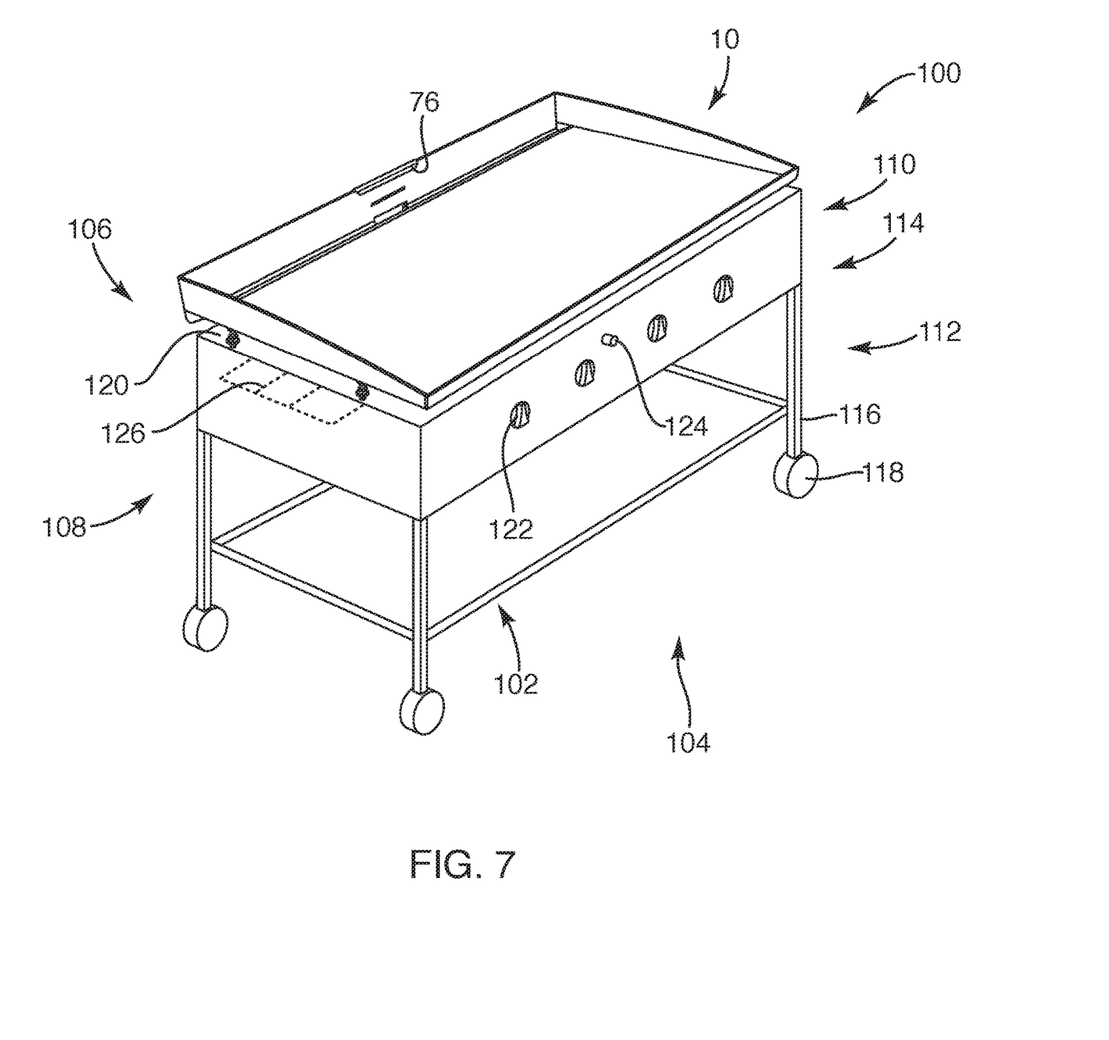
FIG. 7 is a perspective view of a cooking station with the griddle, according to another embodiment of the present invention.

With respect to FIG. 7, a simplistic view of a cooking station 100 with the griddle 10 positioned thereon is depicted. The cooking station 100 may include a frame 102 that extends along a front side 104, a rear side 106, a left side 108 and a right side 110, each of which may extend between a lower portion 112 and an upper portion 114. The lower portion may include legs 116 with casters 118 such that the cooking station 100 may be portable. The upper portion 114 may include upper facing structure 120 to support the griddle 10. The upper portion 114 may also include multiple heating elements 126 (shown with dashed lines), such as gas flame burners sized for propane or natural gas, positioned below the griddle 10 within the frame 102 and adjacent the upper portion 114 of the frame 102, which may be controlled with burner knobs 122 and an igniter button 124, for example, as known to one of ordinary skill in the art. The cooking station 100 may be any suitable cooking station that can effectively support the griddle 10, as described herein, and further, the cooking station 100 may include the typical components for fueling the cooking station arranged and associated with the cooking station 100 to facilitate heating the griddle 10, as known to one of ordinary skill in the art.

Figure 8:
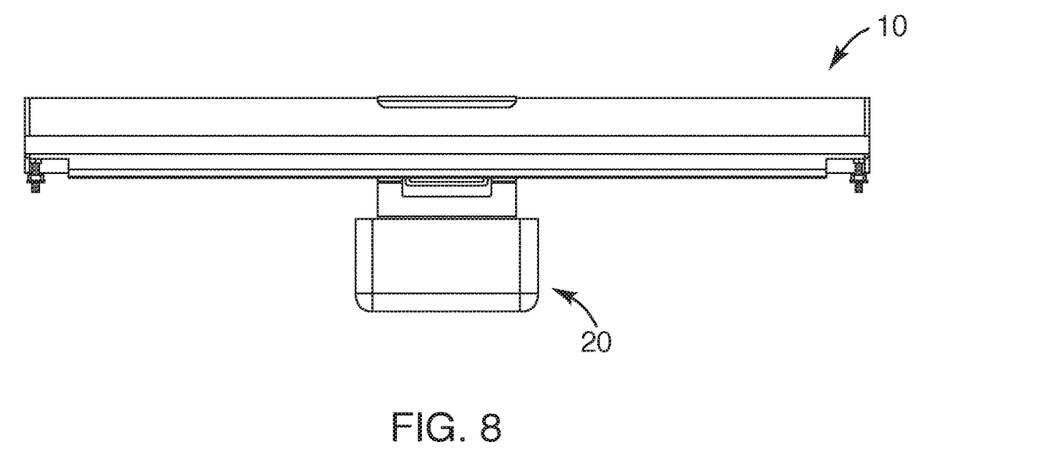
FIG. 8 is a front view of the griddle with the grease container, according to another embodiment of the present invention.
Figure 9:
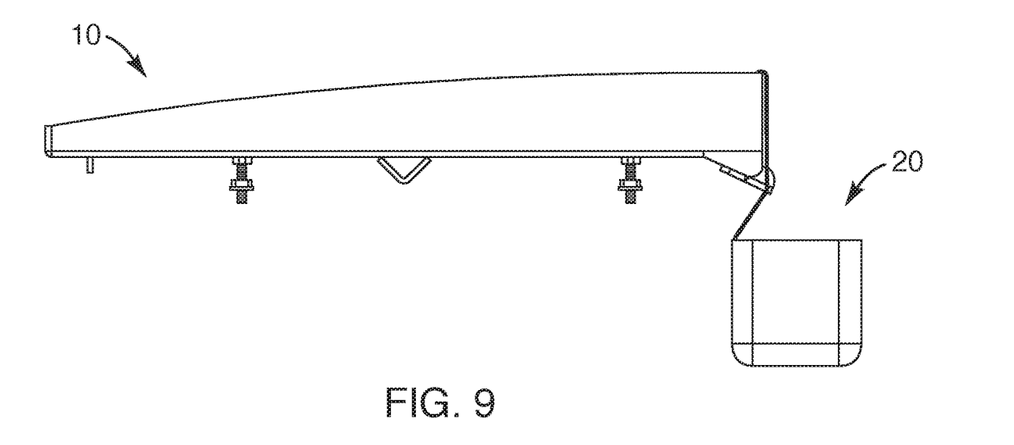
FIG. 9 is a right side view of the griddle with the grease container, according to another embodiment of the present invention.
Figure 10:
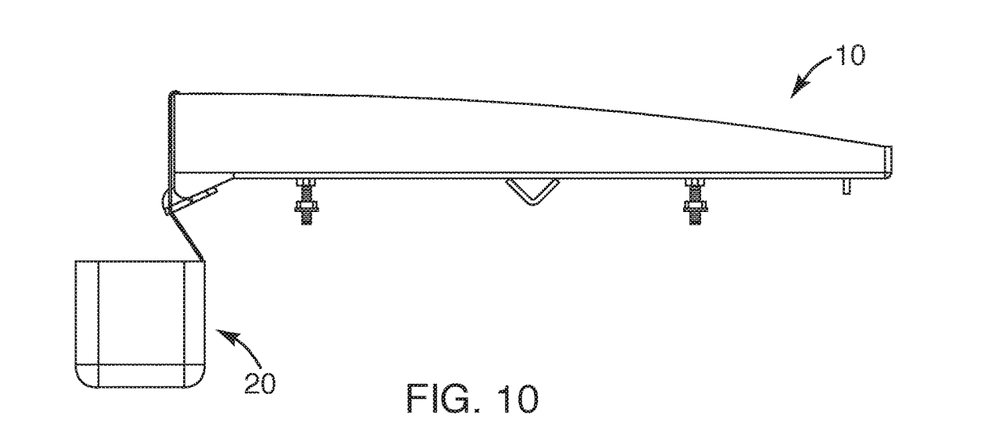
FIG. 10 is a left side view of the griddle with the grease container, according to another embodiment of the present invention.
Figure 11:
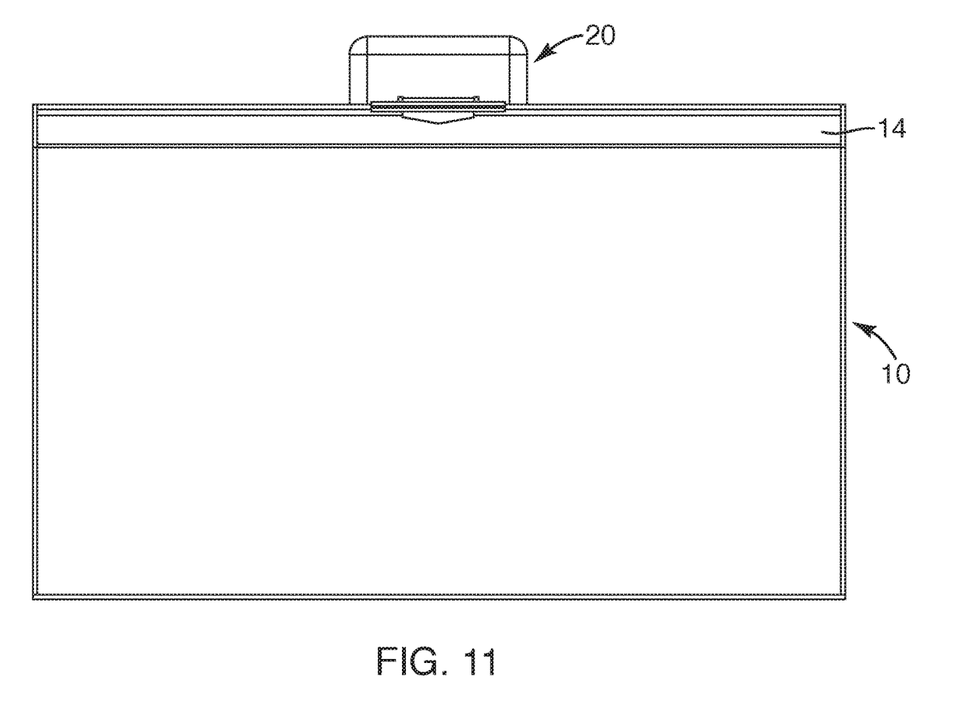
FIG. 11 is a top view of the griddle with the grease container, according to another embodiment of the present invention.
Figure 12:
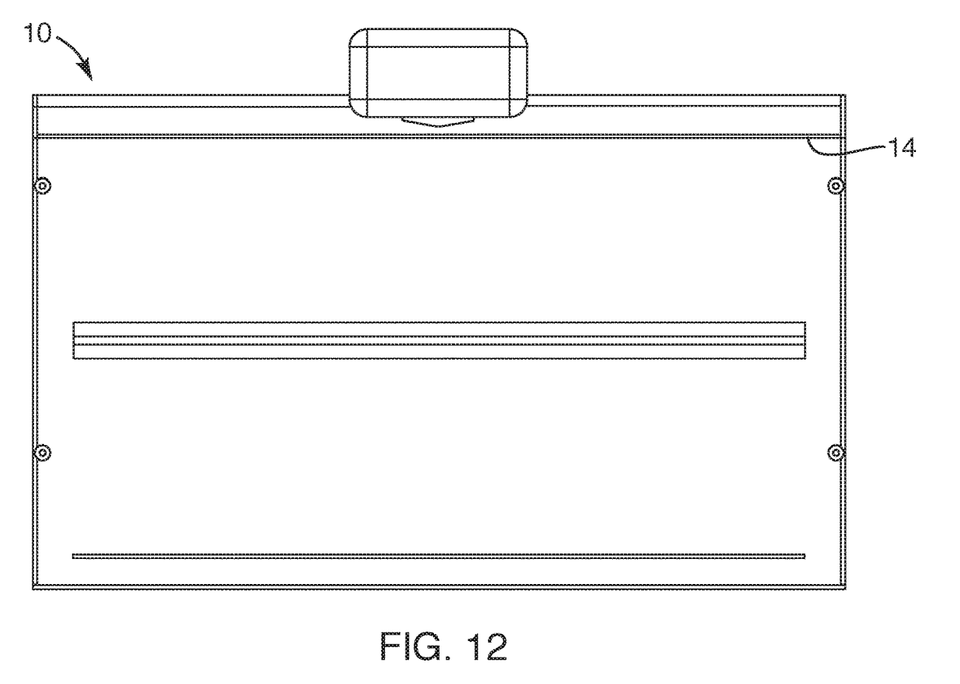
FIG. 12 is a bottom view of the griddle with the grease container, according to another embodiment of the present invention.

FIGS. 8 through 12 show various views, not previously depicted, of the griddle 10 with the grease container 20 coupled thereto. As depicted in FIGS. 8-10, the grease container 20 extends below the griddle with a portion of the extension extending inward from the rear side of the griddle. As depicted in FIGS. 11-12, the before-described trough 14 extends longitudinally along the rear side of the griddle 10 with the grease container 20 centered along the trough 14.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A griddle system configured to manage unwanted food byproducts, comprising:
   a griddle including an upper side and an underside, the upper side including a flat cooking surface extending to define a rear end, a front end, a left end and a right end, the rear end extending parallel relative to the front end and the left end extending parallel relative to the right end, the upper side including a splash guard extending along an entire periphery of the upper side of the griddle so as to extend above the flat cooking surface, the splash guard extending to define a rear splash guard, a front splash guard, a left splash guard and a right splash guard, the front splash guard and the left and right splash guards directly extending upward from the flat cooking surface along entire lengths of the respective front, left and right ends of the flat cooking surface;

wherein the splash guard extends with a top edge along each entire length of the respective rear, front, left and right splash guards;

wherein the rear splash guard at least partially defines a rear opening therein such that the top edge along the rear splash guard extends over the rear opening; and wherein the flat cooking surface, adjacent a length of the rear end of the cooking surface, directly extends to a sloped surface to define a trough such that the sloped surface extends with an acute angle relative to the flat cooking surface so as to slope to the rear opening defined in the rear splash guard.

2. The griddle system of claim 1, wherein the rear opening is centrally positioned along the length of the rear splash guard.

3. The griddle system of claim 1, wherein the top edge slopes downward at least partially along the length of the left and right splash guards between the rear splash guard and the front splash guard.

4. The griddle system of claim 1, wherein the rear splash guard extends higher relative to the flat cooking surface than the front splash guard.

5. The griddle system of claim 1, further comprising a grease container, the grease container including a container portion and a latching portion, the latching portion configured to suspend the container portion below the rear opening.

6. The griddle system of claim 1, wherein the underside of the griddle comprises one or more stabilizers secured thereto.

7. The griddle system of claim 1, wherein the underside of the griddle comprises four legs extending from the underside of the griddle.

8. The griddle system of claim 1, wherein the rear opening defined in the rear splash guard is elongated such that the rear opening extends longitudinally along the length of the rear splash guard.

9. A cooking station configured to manage unwanted food byproduct, comprising:

a frame including a front side, a rear side, a left side and a right side each extending between a lower portion and an upper portion, the frame including multiple heating elements coupled thereto, the heating elements controlled with control valves positioned along the front side of the frame such that the front side is opposite the rear side of the frame; and a griddle configured to be supported by the upper portion of the frame, the griddle including an upper side and an underside, the upper side including a flat cooking surface extending to define a rear end, a front end, a left end and a right end such that the rear end extends parallel relative to the front end and the left end extends parallel relative to the right end, the griddle positioned such that the front end of the flat cooking surface corresponds with the front side of the frame, the upper side including a splash guard extending along an entire periphery of the upper side of the griddle so as to extend above the flat cooking surface, the splash guard extending to define a rear splash guard, a front splash guard, a left splash guard, and a right splash guard, the front splash guard and the left and right splash guards directly extending upward from the flat cooking surface along entire lengths of the respective front, left and right ends of the flat cooking surface;

wherein the splash guard extends with a top edge along each entire length of the respective rear, front, left and right splash guards;

wherein the rear splash guard at least partially defines a rear opening therein such that the top edge along the rear splash guard extends over the rear opening; and wherein the flat cooking surface, adjacent a length of the rear end of the cooking surface, directly extends to a sloped surface to define a trough such that the sloped surface extends with an acute angle relative to the flat cooking surface so as to slope to the rear opening defined in the rear splash guard.

10. The cooking station of claim 9, wherein the top edge slopes downward at least partially along the length of the left and right splash guards between the rear splash guard and the front splash guard.

11. The cooking station of claim 9, wherein the rear opening is centrally positioned along the length of the rear splash guard.

12. The cooking station of claim 9, wherein the rear splash guard extends higher relative to the flat cooking surface than the front splash guard.

13. The cooking station of claim 9, further comprising a grease container, the grease container including a container portion and a latching portion, the latching portion configured to suspend the container portion below the rear opening.

14. The cooking station of claim 9, wherein the underside of the griddle comprises one or more stabilizers secured thereto.

15. The cooking station of claim 9, wherein the underside of the griddle comprises four legs extending from the underside of the griddle.

16. The cooking station of claim 9, wherein the rear opening defined in the rear splash guard is elongated such that the rear opening extends longitudinally along the length of the rear splash guard.

17. A method for managing grease at a cooking station, the method comprising:

supporting a griddle on an upper portion of a frame of a cooking station with heating elements coupled to the frame and controlled with control valves positioned along a front side of the cooking station, the griddle having a flat cooking surface extending to define a rear end, a front end, a left end and a right end such that the front end extends parallel relative to the rear end and the left end extends parallel relative to the right end, the griddle including a splash guard having a top edge extending along an entire periphery of the griddle such that the splash guard extends above the flat cooking surface, the splash guard extending to define a rear splash guard, a front splash guard, a left splash guard and a right splash guard such that the front splash guard and the left and right splash guards directly extend upward from the flat cooking surface along entire lengths of the respective front, left and right ends of the flat cooking surface, the griddle being supported on the upper portion of the frame such that the front end of the cooking surface corresponds with the front side of the cooking station; and managing the grease from cooked food on the cooking surface by disposing the grease through a rear opening at least partially defined in the rear splash guard such that the top edge along the rear splash guard extends over the rear opening;

wherein the managing comprises draining the grease along a trough positioned adjacent the rear end of the cooking surface such that the trough defines a sloped surface extending directly from the cooking surface with an acute angle relative to the cooking surface, the sloped surface of the trough extending downward toward the rear opening.

18. The method according to claim 17, wherein the managing comprises depositing the grease in a grease container positioned with a container portion of the grease container suspended below the rear opening.

19. The method according to claim 17, wherein the managing comprises disposing the grease through the rear opening centrally positioned along a length of the rear splash guard.

20. The method of claim 17, wherein the managing comprises disposing the grease through the rear opening defined in the splash guard such that the rear opening is elongated so as to longitudinally extend along an elongated length of the rear splash guard.

\* \* \* \* \*